April 12, 1955

R. L. MARSH 2,705,858

POWER SHEARS

Filed Nov. 16, 1953

Russell L. Marsh
INVENTOR.

BY *[signatures]*
Attorneys

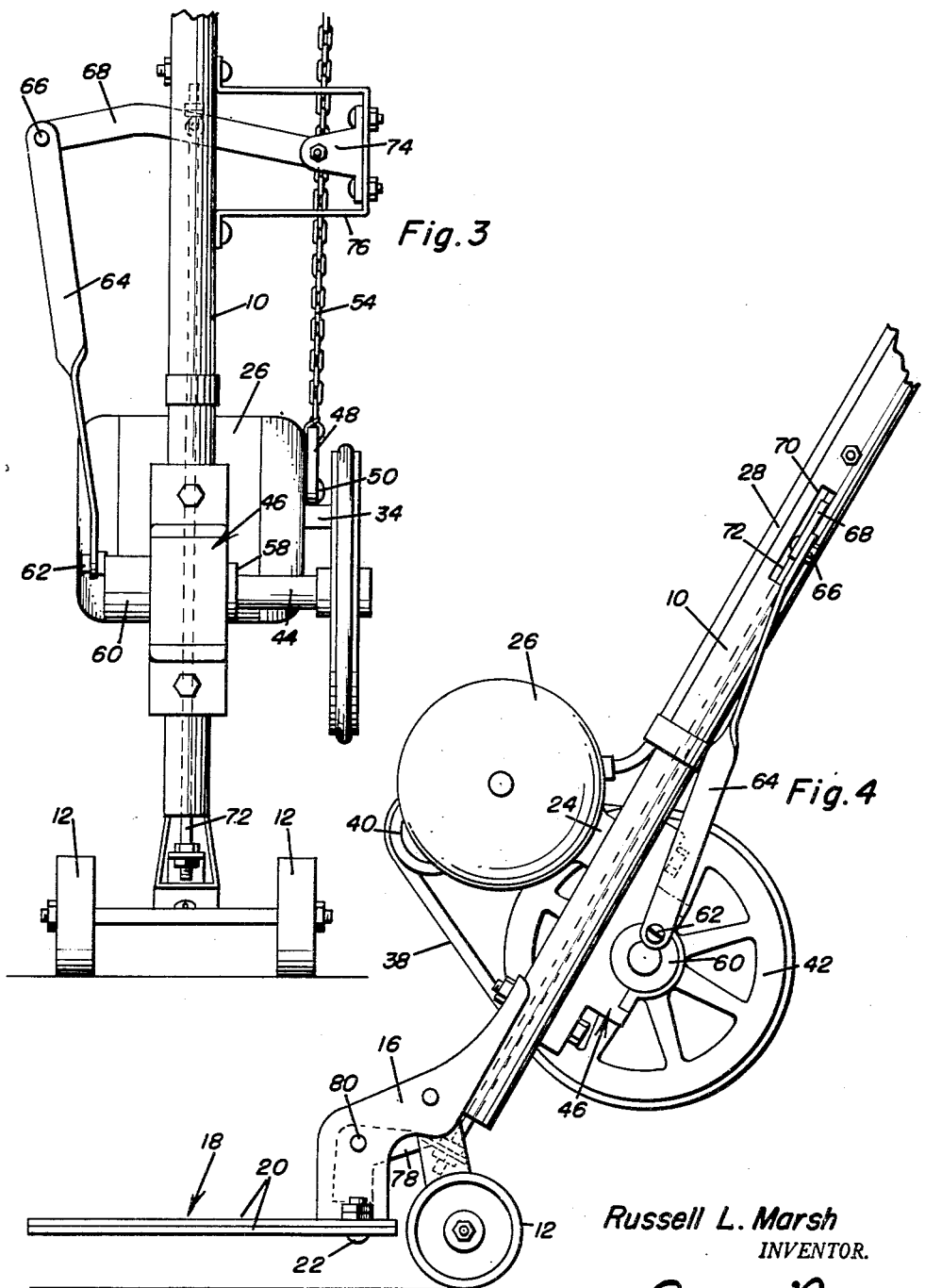

United States Patent Office 2,705,858
Patented Apr. 12, 1955

2,705,858

POWER SHEARS

Russell L. Marsh, Easton, Pa.

Application November 16, 1953, Serial No. 392,153

2 Claims. (Cl. 56—25)

This invention relates generally to devices for cutting grass and the like, and pertains more particularly to an improved form of power shear assembly.

A primary object of this invention is to provide an improved form of power shear assembly incorporating a simplified and improved form of drive mechanism which is constructed of a minimum number of parts and which is characterized by economical yet effective construction.

Another object of this invention is to provide an improved drive mechanism for power shears which incorporates a stationarily mounted motor and drive shaft and a movably mounted idler pulley selectively movable between an inoperative position and a shear actuating operative position.

Another object of this invention is to provide an improved drive mechanism for power shears which includes a reciprocating rod member disposed within and projecting from one end portion of the main frame member of the assembly, and an actuating lever or link projecting through the frame member and connected to the rod.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is another enlarged elevational view taken substantially along the plane of section line 3—3 in Figure 1; and Figure 4 is an enlarged fragmentary elevational view taken on the opposite side of the assembly of Figure 1.

Figures 1, 2:
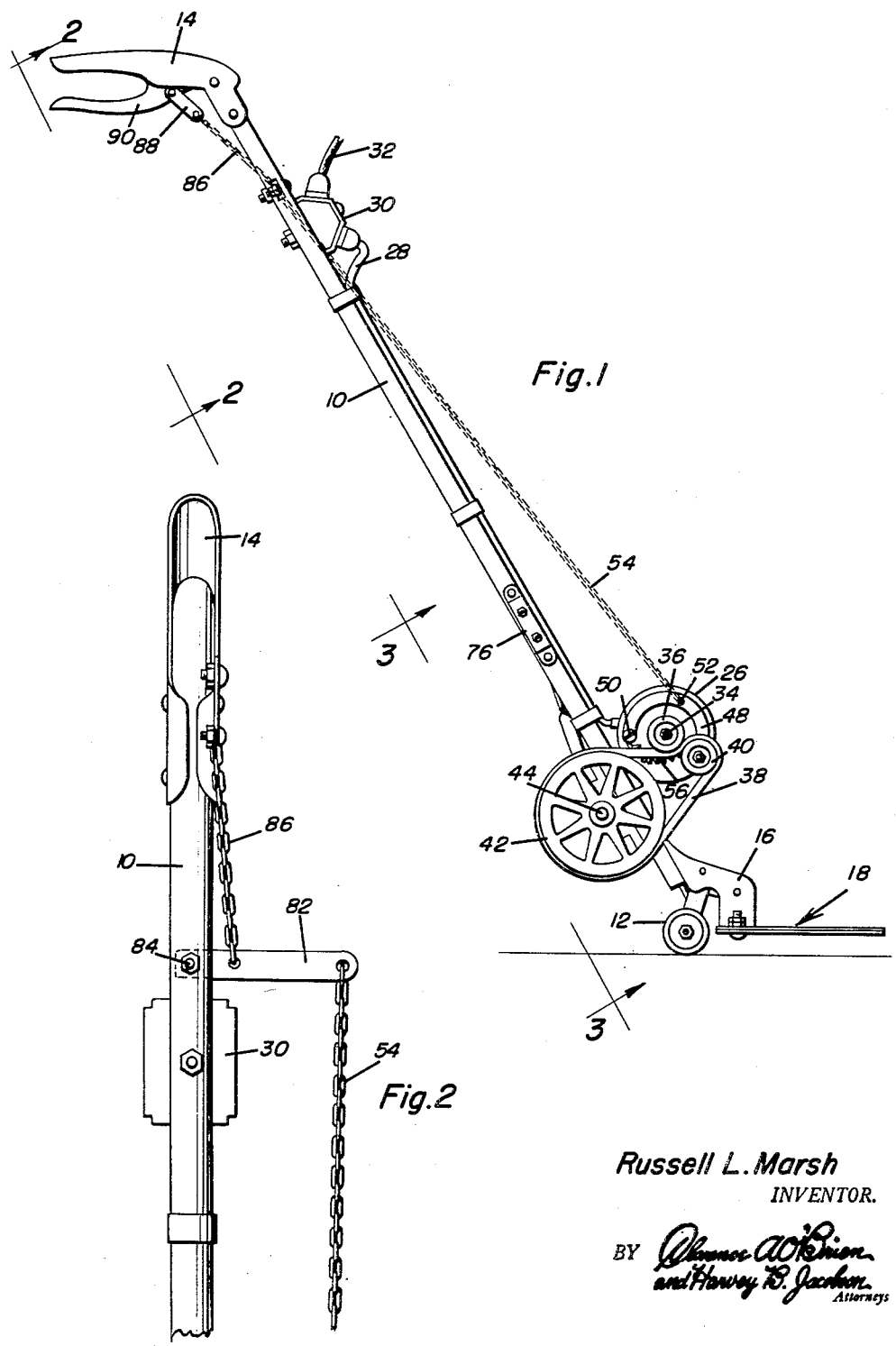
Figure 1 is a side elevational view of the power shear assembly.
Figure 2 is an enlarged elevational view taken substantially along the plane of section line 2—2 in Figure 1.

Referring now more particularly to the drawings, reference numeral 10 indicates the main frame member of the machine which may be constructed of any suitable material and which is generally cylindrical in configuration, as shown, but which may take any desired shape. A pair of supporting wheel members 12 are provided at one end of the frame member 10, and the opposite end of the frame member is provided with a hand grip member 14, in the manner shown. A suitable bracket 16 is provided on the lower end of the member 10 and this bracket terminates at its lower end in the shear assembly indicated generally by the reference character 18 which includes a pair of shears or blade members 20 pivotally interconnected as by the pivot element 22. Since the shear assembly forms no part of this invention, suffice it to say that the assembly is preferred to incorporate a stationary and a movable blade element, and that the operation of the hereinafter described drive mechanism is such as to effect a scissors-like action therebetween for cutting grass and the like.

Mounted on the frame member 10 as by a suitable bracket 24 is a motor assembly 26. It is preferred that this motor be electrically driven, and for this purpose, a suitable electrical line 28 is provided which is plugged into a junction box 30 adjacent the upper end of the frame member 10, and a supply conduit 32 is removably plugged into the junction box in the manner shown most clearly in Figure 1. The drive shaft 34 of the motor is provided with a friction drum member 36 which is preferably peripherally grooved for maximum surface engagement with the belt member 38 which is trained over the idler pulley 40 and driven pulley 42, in the manner shown. The driven pulley 42 is secured to a driven shaft member 44 journaled in a suitable bearing assembly 46 secured to the frame 10, the driven shaft being disposed in spaced parallel relation to the drive shaft 34 of the motor. The idler pulley 40 is journaled to one end of a substantially C-shaped actuating lever 48 which is pivotally secured as by a pivot member 50 at its opposite end to the electric motor casing. An intermediate portion of the lever 48 is provided with a securing pin member 52 to which one end of a flexible element or chain 54 is attached, and it will be manifest that tensioning of the chain will pivot the idler pulley 40 towards the drive pulley or drum 36 such as to effect engagement between the latter and the drive belt 38. For normally declutching the assembly, a tension spring 56 is provided, this spring being connected to the free end of the lever 48 and to the motor casing, respectively.

The driven shaft 44 is provided with a thrust collar 58 on one side of the bearing assembly 46 and an enlarged portion 60 on the opposite side thereof, a driving pin member 62 being secured eccentrically of the shaft in the manner shown most clearly in Figure 3. A connecting rod member 64 is secured to this eccentric pin and extends upwardly therefrom for pivotal connection, as at 66, to the oscillating link 68, which projects through a transverse slot 70 in the frame member 10. The lower end of the frame member is provided with a longitudinal bore through which a reciprocating rod member 72 is received. The upper end of the rod 72 is pivotally secured to an intermediate portion of the link 68, and the end of this link opposite the pivotal connection to the connecting rod 64 is pivotally connected to a bracket member 74 secured to the U-shaped bracket member 76 connected at one side of the frame member 10. In this manner, it will be seen that when the driven shaft 44 is rotated, the connecting rod will oscillate the link 68 and effect reciprocation of the rod 72 which is connected at its lower end to a bellcrank member 78 pivotally secured, as at 80, to the bracket 16 and whose opposite or lower end is suitably connected in any desired manner to the movable shear blades for actuation thereof. The rocking movement of the bellcrank forward and rearward will, because the bellcrank is connected to the movable shear blade eccentrically with respect to the pivot point of the movable blade cause oscillation of the movable blade.

For controlling movement of the idler pulley 40, it will be seen that the upper end of the flexible element 54 is connected to a lever 82 whose inner end is pivotally connected, as at 84, to the frame member 10. A further flexible element 86 is connected to an intermediate portion of the lever 82 and extends upwardly therefrom to a connecting link 88 secured to a trigger member 90 underlying the hand grip member 14. In this manner, one hand gripping operation on the trigger member 90 and hand grip member 14 will effect tensioning of the flexible elements 86 and 54 such that the idler pulley 40 will be moved toward the drive pulley 36 to effect drive to the shear members 18.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. In a power shear assembly, an elongated frame member, a motor mounted on said member, said motor having a drive shaft provided with a driving pulley, a driven shaft journaled on said member in spaced parallel relation to said motor drive shaft, a driven pulley on said driven shaft, an idler pulley, means carried by said frame member mounting said idler pulley for movement toward and away from said drive pulley, a belt trained over said driven and idler pulleys, a pair of blades provided at one end of the elongated member, means connected to said driven shaft for oscillating one of said blades, said last named means including a rod disposed within and projecting from said one end of the frame member, said frame member having a transverse slot therein, a link projecting through said slot and pivotally secured to one side of said frame member, the intermediate portion of said link being connected to said rod, and a connecting rod connected to the other end of said link and to said driven shaft.

2. In a power shear assembly, an elongated frame member, a motor mounted on said member, said motor having a drive shaft provided with a driving pulley, a driven shaft journaled on said member in spaced parallel relation to said motor drive shaft, a driven pulley on said driven shaft, a C-shaped lever pivotally secured at one end to said motor, an idler pulley on the other end of said lever, means carried by said frame member for moving said idler pulley toward and away from said drive pulley, said last named means including a flexible member secured at one end to an intermediate portion of said lever and a manually operable trigger having said flexible member attached thereto carried by said frame member for selectively tensioning and releasing said flexible member, a belt trained over said driven and idler pulleys, a pair of blades provided at one end of the elongated member, means connected to said driven shaft for oscillating one of said blades, said last named means including a rod disposed within and projecting from said one end of said frame member, said frame member having a transverse slot therein, a link projecting through said slot and pivotally secured to one side of the frame member, the intermediate portion of said link being connected to said rod, and a connecting rod connected to the other end of said link and to said driven shaft.

References Cited in the file of this patent

UNITED STATES PATENTS

| | | |
|---|---|---|
| 421,241 | Carr | Feb. 11, 1890 |
| 619,644 | Walters | Feb. 14, 1899 |
| 818,708 | Pitner | Apr. 24, 1906 |
| 2,219,494 | Rieger | Oct. 29, 1940 |
| 2,397,310 | Donald | Mar. 26, 1946 |
| 2,506,638 | Gleisen | May 9, 1950 |
| 2,629,220 | Grieder | Feb. 24, 1953 |